(12) United States Patent
Borisenko

(10) Patent No.: US 7,042,708 B1
(45) Date of Patent: May 9, 2006

(54) HIGH CAPACITANCE ENERGY STORAGE DEVICE

(75) Inventor: Nikolay Borisenko, deceased, late of Moscow (RU); by Dmitry Borisenko, legal representative, Moscow (RU)

(73) Assignee: Selected Molecular Technologies Corporation, Toronto (CA)

( * ) Notice: Subject to any disclaimer, the term of this patent is extended or adjusted under 35 U.S.C. 154(b) by 0 days.

(21) Appl. No.: 09/807,485

(22) PCT Filed: Oct. 13, 1999

(86) PCT No.: PCT/CA99/00928

§ 371 (c)(1),
(2), (4) Date: Jun. 17, 2002

(87) PCT Pub. No.: WO00/22637

PCT Pub. Date: Apr. 20, 2000

(30) Foreign Application Priority Data

| Oct. 13, 1998 | (CA) | 2250628 |
| Mar. 19, 1999 | (CA) | 2266185 |
| Mar. 19, 1999 | (CA) | 2266297 |

(51) Int. Cl.
*H01G 9/00* (2006.01)

(52) U.S. Cl. ..................... 361/502; 361/503
(58) Field of Classification Search ......... 361/502–503
See application file for complete search history.

(56) References Cited

U.S. PATENT DOCUMENTS

| 3,652,902 A | | 3/1972 | Hart et al. | |
| 4,408,259 A | * | 10/1983 | Muranaka et al. | 361/434 |
| 4,594,758 A | | 6/1986 | Watanabe et al. | |
| 4,597,028 A | | 6/1986 | Yoshida et al. | |
| 4,709,303 A | * | 11/1987 | Fujiwara et al. | 361/502 |
| 5,072,336 A | * | 12/1991 | Kurabayashi et al. | 361/502 |
| 5,381,303 A | * | 1/1995 | Yoshida et al. | 361/502 |
| 5,393,619 A | | 2/1995 | Mayer et al. | |
| 6,021,039 A | * | 2/2000 | Inagawa | 361/502 |

FOREIGN PATENT DOCUMENTS

RU    2 054 723    *   2/1996

* cited by examiner

*Primary Examiner*—Eric W. Thomas
(74) *Attorney, Agent, or Firm*—I. Zborovsky

(57) ABSTRACT

A high capacitance energy storage device where electrodes (20, 22) are formed of layers of a carbonised, activated woven fabric that has been impregnated with an electrolyte. The electrolyte is absorbed by active centers at the surface of the carbonised, activated material. The prepared fabric is sandwiched between alternating graphite-based separators (16, 18) and non-conductive membranes (24) to form a capacitor structure exhibiting very high capacitance, non-degradation over multiple charging/discharging cycles, and, in AC installations, reliable and reproducible characteristics. In addition, the materials in the device are environmentally friendly.

15 Claims, 2 Drawing Sheets

HIGH CAPACITANCE ENERGY STORAGE DEVICE

FIELD OF THE INVENTION

The present invention relates to energy storage devices. In particular, the present invention relates to high capacitance energy storage devices, such as capacitors.

BACKGROUND OF THE INVENTION

Relatively inexpensive and reusable electrical energy storage devices are clearly desirable. Prior art storage devices mainly consist of electrochemical cells. Typical electrochemical cells or batteries, such as iron-nickel and nickel-cadmium cells, have a number of well known disadvantages. Generally, the substances used to produce such cells are expensive and relatively scarce. These substances also tend to be non-recyclable, and potentially harmful to the environment, resulting in both costly production, reclamation and disposal. Electrochemical cells have a limited service life, ie. number of charge/discharge cycles, and shelf life, due to the irreversible reaction of either the electrolyte or electrodes in every charge/discharge cycle. In addition, their efficiency is relatively low, typically in the range of 15–50%, and depends on the operating conditions in which they are used, such as the ambient temperature.

Some advances have been made in the field of electrochemical batteries, such as the suppression of gas evolution by adding variable valency compounds to the electrolyte, and replacing environmentally harmful substances with metal hydrides. However, these advances add considerably to the cost of producing batteries and have not been widely adopted. Furthermore, the primary disadvantages of conventional batteries, there low efficiency, limited lifespan and degrading output, are not greatly improved by these changes.

Capacitors capable of storing large amounts of electrical energy, such as carbon double layer capacitors, are also known. Typically, these capacitors use carbonised materials to form polarized electrodes. Generally, the carbonised material is a paste formed from a carbon particle powder in combination with a binding agent. The carbon paste is spread over a metallic mesh which is packaged in a housing at high pressure to form the electrodes. While such capacitors have a theoretically high capacitance, the paste used exhibits non-Newtonian flow characteristics, and, therefore, under the high pressures required to achieve good electrical properties, the symmetric geometry of the electrodes necessary to produce high capacitance is compromised. Changes in the electrode geometry lead to variations in the electric characteristics of separate cells, which fact leads to the destabilization of the capacitor in general and its eventual breakdown.

It is, therefore, desirable to provide a high capacitance energy storage device that obviates or mitigates at least one of the disadvantages of the prior art.

SUMMARY OF THE INVENTION

A high capacitance energy storage device where electrodes are formed of layers of a carbonized, activated woven fabric that has been impregnated with an electrolyte. The electrolyte is absorbed by active centers at the surface of the carbonized, activated material. The prepared fabric is sandwiched between alternating graphite-based separators and non-conductive membranes to form a capacitor structure exhibiting very high capacitance, non-degradation over multiple charging/discharging cycles, and, in AC installations, reliable and reproducible characteristics. In addition, the materials used in the device are environmentally friendly.

In an embodiment of the present invention, there is provided a high capacitance energy storage device. The device consist of a housing that is electrically isolated from, and lined with, conductive, chemically inert separators. The separators are, in turn, electrically connected to contacts mounted on the housing. At least one capacitive cell is contained within the housing. Each capacitive cell has a first electrode separated from a second electrode by a non-conductive, chemically inert membrane. The electrodes are formed of a carbonized and activated woven fabric impregnated with an electrolyte, the molecules of which can freely pass through the membrane. The cell is in electrical and mechanical contact with the separators.

In a further aspect, there is provided a capacitive cell for a high energy storage device. The cell consists of a first electrode separated from a second electrode by a non-conductive, chemically inert membrane. The electrodes are formed of a carbonized, activated woven fabric impregnated with an electrolyte. The chemically inert membrane permits free passage of molecules of said electrolyte therethrough.

BRIEF DESCRIPTION OF THE DRAWINGS

Preferred embodiments of the present invention will now be described, by way of example only, with reference to the attached Figures, in which.

DETAILED DESCRIPTION

Figure 1:
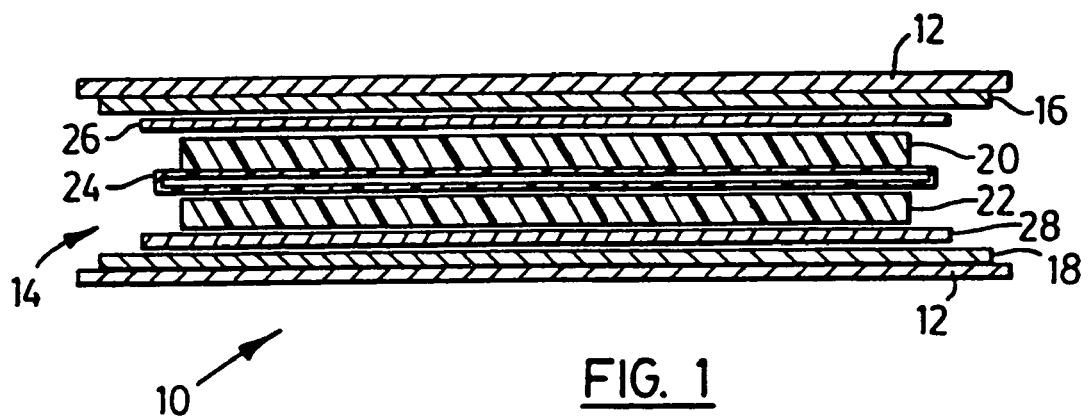
FIG. 1 shows a cross section of a single layer cell of a high capacitance energy storage device according to the present invention.

A first embodiment of a high capacitance energy storage device 10 according to the present invention is shown in FIG. 1. Device 10 consists of a housing 12 within which a single layer capacitive cell 14 is contained. In a preferred embodiment, housing 12 is a duralumin shell separated from cell 14 by current collectors 16, 18 which electrically isolate the housing 12 from the cell 14. Current collectors 16, 18, shown in FIG. 1 as separate elements, can form part of housing 12. If current collectors 16, 18 form the upper and lower surfaces of the housing 12, the side walls are chosen to electrically isolate them from each other. In this case, the side walls can be an appropriate dielectric material. The case is air tight and its internal surface is chemically isolated from an electrolyte used in the cell. Contacts (not shown) are provided on the exterior of the housing 12, as is well known to those of skill in the art.

Cell 14 consists of electrodes 20, 22 separated by a non-conductive, chemically inert membrane 24. The non-conductive, chemically inert membrane can be chosen from a wide selection of materials, provided they are transparent to the electrolyte particles. Suitable materials include:

mipor, miplast, cellulose or paper-based sheets, and perforated polymer films, such as polyethylene, polystyrole and fluoroplast. The membrane 24 is transparent to the molecules of the electrolyte to permit the free passage of the molecules therethrough under the influence of an applied voltage. In a presently preferred embodiment, sulfuric acid in a water solution has been found to be a suitable electrolyte, but the present inventors contemplate that other electrolytes, as are known to those skilled in the art, can be employed. Generally, any electrolytic liquid, liquid mixture, sol/gel, etc. whose molecules initially have a non-uniform electron density, is applicable. It has been found that if the electrolyte is ionic, the effect of the charge redistribution at the time of charging device 10 is be more efficient.

Conductive, chemically inert separators 26, 28, that are barriers to the electrolyte molecules, are inserted between the housing 12 and the electrodes 20, 22 to chemically isolate the cell 14 from housing 12. The separators 26, 28 can be formed from a variety of materials having a graphite base. Such chemically inert materials include: graphite plates and graphite foil (graphlex), conductive rubber and conductive polymer films.

Electrodes 20, 22 are made of a regularly structured organic substance, such as material woven from hydrocellulose. The hydrocellulose material is carbonized, and activated, or charged. Suitable woven materials are presently available for use as charged filters and, in the medical field, to cover wounds. Carbonization is conducted for the purpose of producing chemically inert materials from the organic substance. Activation creates a porous structure with active centres. A method of producing such materials is described in Russian Federation Patent No. 2000360, dated Jan. 22, 1992. In a currently preferred embodiment, the inventors of the present invention have successfully employed UVIS-AC cloth, manufactured by UVICOM, but other similar materials can be used as well. Generally, the carbonized, activated material should exhibit a specific surface area of 800–2000 m$^2$/g, a total porosity of 0.25–0.80 cm$^3$/g, and surface density of 100–300 g/m$^2$, and should contain little or no ash.

In a preferred embodiment, the electrodes 20, 22 are made of a woven fabric with a regular structure. The fabric is carbonized and activated, as described above. An electrolyte, such as sulfuric acid in solution, is impregnated onto the carbonized activated electrode fabric. The electrolyte can be any liquid, the molecules of which will have a non-uniform electron density when absorbed into the active centers on the carbonized, activated fabric, or when an electric field is applied. The impregnation of the electrolyte is a presently believed to be purely physical absorption, and a free volume of the electrolyte is absent once absorbed. The electrolyte is mainly absorbed on electrodes 20, 22 and non conductive inert transparent membrane 24. The electrolyte is a solution, mixture or a pure substance assisted by electrodes 20, 22 possessing active centres, in particular, carbonyl, carboxyl, hydroxyl and other groups. Generally, the impregnated electrodes 20, 22 exhibit characteristics of a solid body, as opposed to a non-Newtonian fluid as in the prior art.

Figure 4:
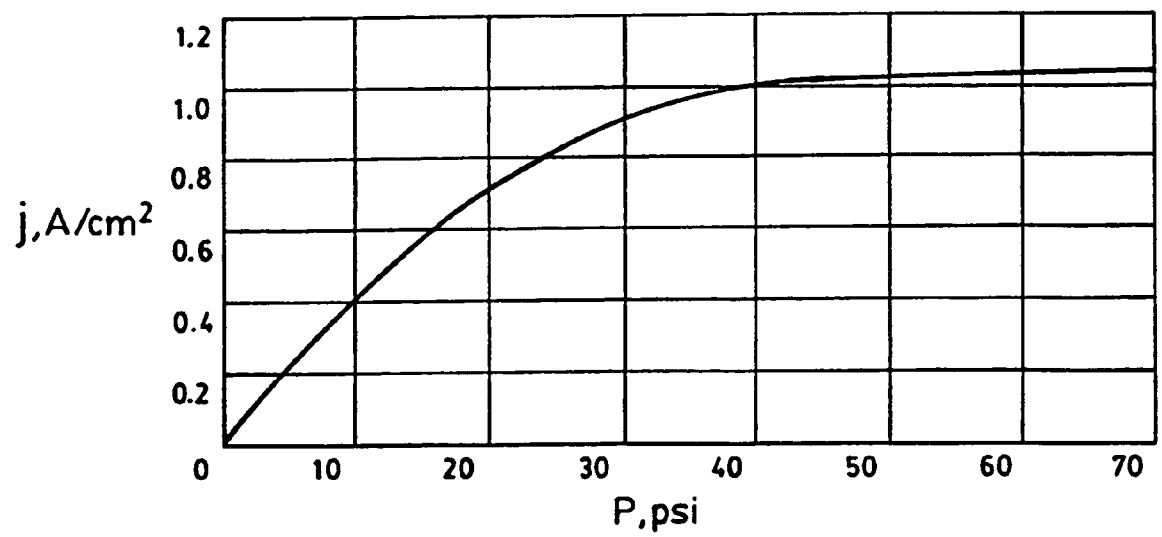
FIG. 4 shows a graphical representation of current density in relation to applied sandwiching pressure for a high capacitance energy storage device according to the present invention.

The device 10 is assembled as describe above while ensuring that the electrode geometry is regular. The electrode geometry at the time of assembly is confirmed by ensuring a dependence between the received current density J relative to the pressure applied at the time of assembly, as shown in FIG. 4. As FIG. 4 shows, at pressures greater than 40 psi, further increase in pressure does not significantly alter the current density. In a preferred embodiment, device 10 is assembled at pressure of about 30 to about 80 psi. It has been found that this pressure range is sufficient to ensure reliable contact of all parts and elements contained in cell 14. In comparison with the high pressures required in prior art capacitors, this lower pressure of assembly can substantially simplify manufacture.

As will be apparent, the absorption of the electrolyte into the carbonized, activated woven fabric forms a generally solid, chemically indifferent electrode/electrolyte interface. At the very surface of the electrodes there is, in fact, a two phase, ie. solid/liquid surface. This has the advantage of dispensing with electrochemical reactions between the electrodes and electrolyte during charging and discharging, as is found in prior art high capacitance capacitors and batteries. It is believed that the absence of electrochemical reactions at the interface results from the low voltage at which device 10 can operate. The nominal operating voltage for device 10 is less than that which causes a reaction to occur. For example, if the disassociation voltage for water is 1.24 V, then device 10 is operated at a voltage below 1.24 V to prevent disassociation. Likewise, if the chosen electrolyte is sulfuric acid in a water solution (with a disassociation voltage of 1.67V) then device 10 is optimally operated at voltages below 1.67V.

$$C = \frac{\varepsilon_0 \varepsilon S}{d}$$

where
$\varepsilon_0$ 8.85×10$^{-12}$ F/m
$\varepsilon$=permittivity of free space~1 (assuming interparticle space between electrolyte ions to be a vacuum)
S=electrode surface area (m$^2$)
d=distance between an electrode surface and the center of an electron density of the electrolyte particle Assuming the radius of an electrolyte particle to be in the order of 0.3×10$^{-10}$ m, the capacitance per unit area can be approximated as:

$$C' = \frac{C}{S} \approx \frac{\varepsilon_0}{d} \approx 0.3 \ F/m^2$$

Typically, an impregnated, woven fabric as described above has an electrode surface area in the range of 1000 m$^2$/g, and as high as 2500 m$^2$/g, resulting in energy storage devices having capacitances in the range of 300–750 F/g.

The energy stored by device 10 can be calculated by determining:

$$W = \frac{CU^2}{2}$$

where U=the voltage applied across the electrodes.

Figure 2:
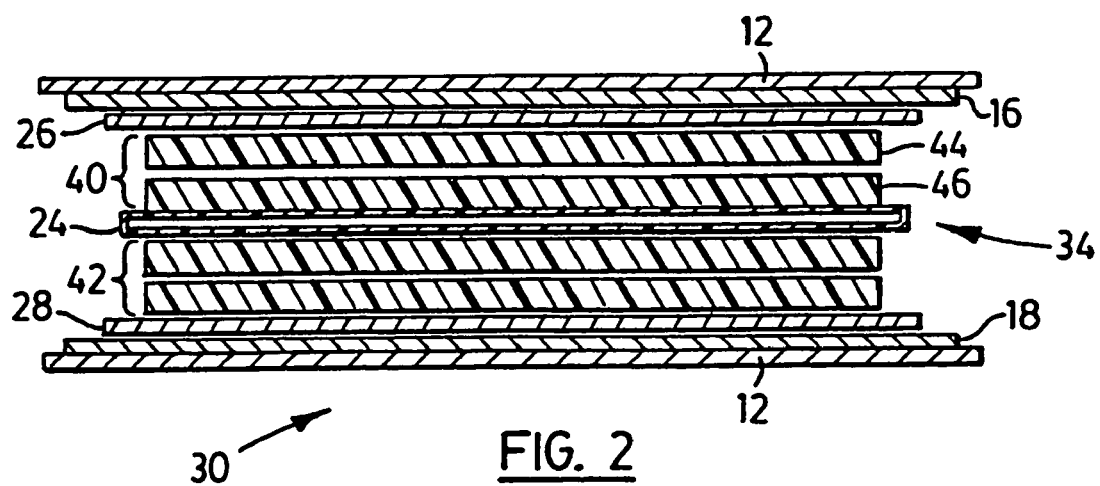
FIG. 2 shows a cross section of a double layer cell of a high capacitance energy storage device according to the present invention.

FIG. 2 shows a second embodiment of a high capacitance energy storage device 30, having a double layer capacitive cell 34, in accordance with the present invention. Similar elements are referenced by similar numerals in all Figures. Cell 34 consists of two electrodes 40, 42. Each electrode 40, 42 consists of two layers 44, 46 of the impregnated, woven material described above, thereby effectively doubling the capacitance, as will be well understood to those familiar with capacitor design, of the resulting device 30 in comparison to the embodiment of device 10.

Figure 3:
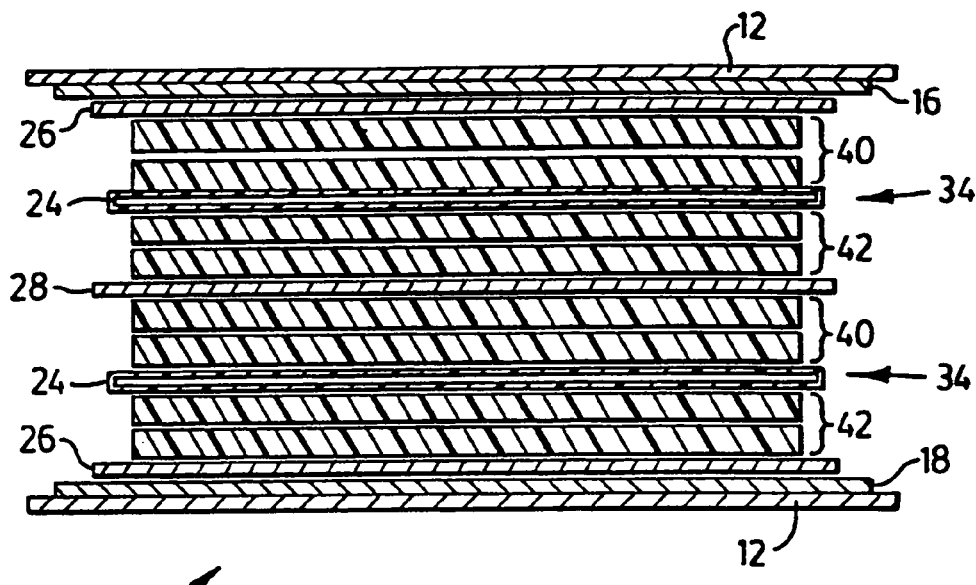
FIG. 3 shows a cross section of a high capacitance energy storage device having a two double layer cells connected in series, according to the present invention.

FIG. 3 shows a third embodiment of a high capacitance energy storage device 50 having two cells 34 connected in series within housing 12. As will be well understood by those skilled in basic circuit theory, connecting the cells in series doubles the voltage that can be applied across device 50 as compared to device 30.

As an example of a high capacitance energy storage device according to the present invention, the inventors of the present invention have constructed a high capacitance energy storage device consisting of three 2 V units, each unit consisting of a pair of cells connected in series, as shown in FIG. 3. The device was built to resemble the standard case of a 6V chemical battery, IEC4R25. Each unit had dimensions 62×62×30 mm, giving a volume of 110 cm$^3$ and a mass of 105 gm. The electrodes of each cell were formed of 18 layers of the carbon impregnated woven material, such that each 2V unit consists of 72 layers of the carbonized activated material, and the total electrode volume was 43 cm$^3$ (44×44×22 mm) with a mass of 95 gm.

The device was charged over an extended period, until the charging current was less than 1 mA. Once charged, each of the three capacitive cells exhibited a capacitance of 700 F∀10%, supplying an energy equal to 1400 J, at 2V. The electrolyte chosen consisted of sulfuric acid in a water solution. The specific energy, excluding the mass and volume of the housing, for the device was 32 J/cm$^3$ or 15 J/gm, with an effective output, including the mass and volume of the housing, measured at 12 J/cm$^3$ or 7 J/gm.

This device has been observed by the inventors to function for three years without interruption as a solar battery in a pulsed operation under natural conditions. No deterioration of characteristics was noticed over that period.

The device of the present invention has significant advantages over prior art energy storage devices. Manufacture of devices from an impregnated woven fabric results in regular, reproducible and constant characteristics, and permits reproduction of capacitors with identical characteristics which do not change with time. The energy storage device of the present invention does not degrade over time, nor do its characteristics change over numerous charging/discharging cycles. Reliable, regular and reproducible contact between the electrode surface, the conductive, inert, non-transparent separator, and the surface of the non conductive inert transparent membrane particularly decreases the internal resistance of the device in comparison with the prior art.

Adding additional layers of fabric to the electrodes and linking cells in parallel and series permits the production of energy storage devices with a variety of capacitances, voltage and current characteristics. As a result, within the same housing cells 14 can be arranged in series and/or parallel, with the only addition being the provision of further separators.

The device of the present invention can also be used in AC installations without any risk of explosion or failure, since it shares the characteristics of a non-electrolytic bipolar capacitor, though it exhibits significantly higher capacitance, and significantly lower self-discharge.

All the materials used in the manufacture of the device of the present invention that come in contact with the electrolyte are chemically inert and do not contain metals. This means that irreversible chemical reactions that cause electrolyte degradation in prior art capacitors, such as gas emission, and the formation of insoluble substances, do not occur in the devices of the present invention. In fact, during the process of charging or discharging, no electro chemical processes take place.

The resulting energy storage device is bipolar. In other words, if charged with one polarity it can be completely discharged and charged with the opposite polarity without risk of explosion or failure. In addition, short circuiting the device does not damage it.

It will be apparent to those skilled in the art that the foregoing is by way of example only. Modifications, variations and alterations may be made to the described embodiments without departing from the scope of the invention which is defined solely in the claims.

We claim:

1. A high capacitance energy storage device, comprising:
a housing electrically isolated from, and lined with, current collectors, said current collectors being electrically connected to contacts mounted on said housing;
at least one capacitive cell having a first electrode separated from a second electrode by a non-conductive, chemically inert membrane, said electrodes formed of a regularly structured carbonized and activated woven fabric impregnated with an electrolyte, said membrane permitting free passage of molecules of said electrolyte therethrough; and conductive, chemically inert separators, provided between and being in electrical and mechanical contact with said electrodes and said current collectors of the housing, said separators chemically isolating said cell from said housing, and said separators being formed from a graphite-based material, wherein each of said electrodes is formed of a plurality of compressed layers of said regularly structured carbonized and activated woven fabric.

2. A device according to claim 1, wherein said separators consist of graphite sheets.

3. A device according to claim 1, wherein said separators consist of conductive rubber.

4. A device according to claim 1, wherein said separators consist of conductive polymer film.

5. A device according to claim 1, wherein said separators consist of graphite foil.

6. A device according to claim 1, wherein said electrolyte is a sulfuric acid solution.

7. A device according to claim 1, wherein said carbonized, activated woven fabric is formed from hydrocellulose.

8. A device according to claim 1, wherein a single one of said separators separates the at least one capacitive cell with another cell.

9. A device according to claim 1, wherein said device is assembled at pressure of about 2 to about 6 kg/cm$^2$ (about 30 to about 80 psi).

10. A device according to claim 1, wherein said carbonised and activated woven fabric exhibit a specific surface area of 800 to 2000 m$^2$/g, a total porosity of 0.25 to 0.80 cm$^3$/g, and surface density of 100 to 300 g/m$^2$.

11. A capacitive cell for a high energy storage device comprising:
a first electrode separated from a second electrode by a non-conductive, chemically inert membrane, said electrodes formed of a regularly structured carbonized and activated woven fabric impregnated with an electrolyte, said membrane permitting free passage of molecules of said electrolyte therethrough; and conductive, chemically inert separators, provided at outer surfaces of the cell and being in electrical and mechanical contact with said electrodes, said separators chemically isolating said cell, and said separators being formed from a graphite-based material, wherein each of said electrodes is formed of a plurality of compressed layers of said regularly structured carbonized and activated woven fabric.

12. A capacitive cell according to claim 11, wherein said electrolyte is a sulfuric acid solution.

13. A capacitive cell according to claim 11, wherein said carbonised, activated woven fabric is formed from hydrocellulose.

14. A capacitive cell according to claim 11, wherein said carbonized and activated woven fabric exhibit a specific surface area of 800 to 2000 $m^2$ μg, a total porosity of 0.25 to 0.80 $cm^3/g$, and surface density of 100 to 300 $g/m^2$.

15. A capacitive cell according to claim 11, wherein said cell is assembled wherein said device is assembled at pressure of about 2 to about 6 $kg/cm^2$ (about 30 to about 80 psi).

* * * * *